Dec. 27, 1927.

A. W. SCHMIDT

CUSHION TIRE

Filed Oct. 18, 1926

1,654,019

Inventor
A. W. Schmidt

Witness
J. P. Pierce

By H. B. Willson & Co.
Attorneys

Patented Dec. 27, 1927.

1,654,019

UNITED STATES PATENT OFFICE.

ADOLPHE W. SCHMIDT, OF LEWISTON, IDAHO.

CUSHION TIRE.

Application filed October 18, 1926. Serial No. 142,373.

The invention aims to provide a new and improved type of cushion tire in which all load is jointly and resiliently carried by a resilient body and a plurality of spring metal rings embedded in and extending circumferentially of said body.

With the foregoing in view, the invention resides in the novel subject matter hereinafter described and claimed, the description being supplemented by the accompanying drawing.

Figure 1:
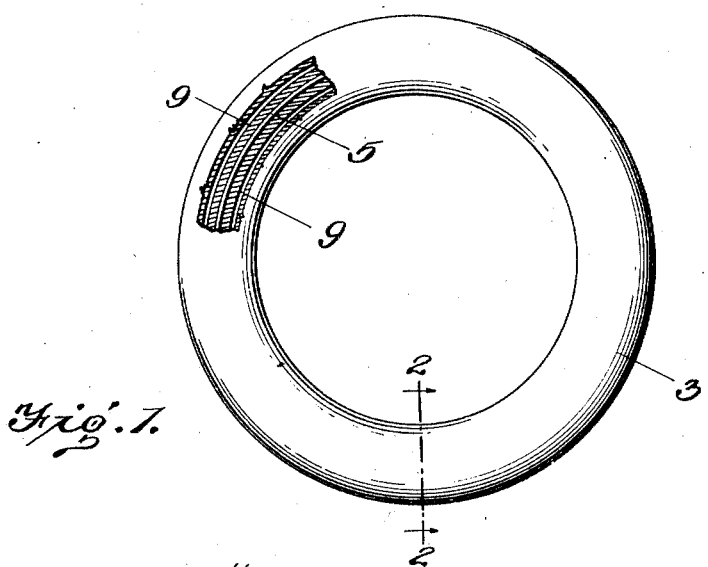
Fig. 1 is a small side elevation partly broken away and in section, showing a tire constructed in accordance with my invention.
Figure 2:
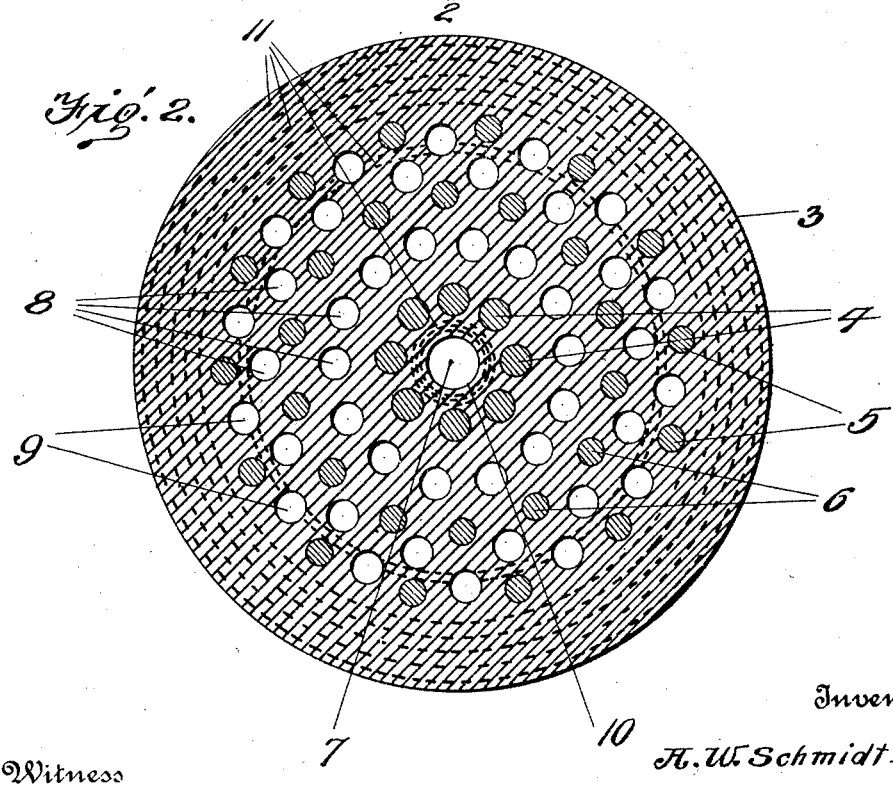
Fig. 2 is a vertical transverse section on line 2—2 of Fig. 1.

In the drawings above briefly described, the numeral 3 designates an annular body of rubber or any elastic substitute either known at the present time or later produced. Embedded in, extending circumferentially of, and spaced apart over the cross section of the body 3, are a number of continuous spring metal rings, said rings being preferably, although not necessarily, formed from steel. These rings and the body 3 are intended to jointly and resiliently carry all load placed upon the tire.

In the present showing, an inner, an outer, and an intermediate series of the spring metal rings are provided, the rings of said series being given the numerals 4, 5 and 6 respectively. The rings of each series are spaced apart about the circumferential center 7 of the body 3, and each series is radially spaced from the adjacent series. These rings may be of any desired cross-sectional shape, of any desired number and size, and spaced in any appropriate manner, according to the size of the tire and the weight to be carried.

Between the annular series of rings, the body 3 is preferably formed with circumferentially disposed, continuous, air ducts 8 which are spaced from each other and are also spaced from the rings. In the present showing, additional ducts 9 are interposed between the rings 5, and a main central duct 10 is provided at the circumferential center of the tire body. These ducts assist in imparting the requisite resiliency to the body 3, and it will be understood that they may be of any desired cross-sectional size, may be spaced in numerous relations, and may be of any desirable number.

At suitable locations, the body 3 is preferably reinforced with fabric, cords or the like 11, which tie all parts of said body together and overcome any tendency toward disruption.

By the novel construction shown and described or a substantial equivalent, a tire is provided which will be equally as resilient as a pneumatic tire, yet will be proof against the troubles incident to the pneumatic tire. The general shape, proportion and construction herein disclosed, may be followed if desired, but it will be understood from the foregoing that numerous variations may be made by the manufacturer, as occasion may demand.

I claim:—

1. A cushion tire comprising a substantially solid, elastic, annular body and a plurality of spring metal rings spaced apart and radially outward in all directions from the center of said body but terminating a considerable distance from the outer surface of the body.

2. A cushion tire comprising an annular elastic body having a comparatively small central annular passage, an inner central annular series of spring metal rings grouped around said passage and additional annular series of spring metal rings spaced radially outward from said central group, the outer series of rings being spaced inwardly a considerable distance from the outer surface of the body.

3. A cushion tire comprising a substantially solid, elastic annular body, and spaced series of spring metal rings embedded in and extending circumferentially of and completely around said body in concentric relation to the center thereof, each series comprising a plurality of rings, circumferentially spaced apart, the rings of each series being arranged in staggered relation with the rings of the adjacent series.

4. A cushion tire comprising a substantially solid, elastic annular body, and spaced series of spring metal rings embedded in and extending circumferentially of and completely around said body in concentric relation to the center thereof, each series comprising a plurality of rings, circumferentially spaced apart, the rings of each series being arranged in staggered relation with the rings of the adjacent series, said body having spaced series of dead air ducts extending circumferentially of and completely around said body in concentric relation to the center thereof and between the series of rings, the ducts of the outer series being arranged between the rings of the outer series of rings, and the ducts of the other series being arranged opposite the spaces between the rings of the other series of rings.

In testimony whereof I have hereunto affixed my signature.

ADOLPHE W. SCHMIDT.